US00H002228H

(19) United States
(12) Statutory Invention Registration
Eick et al.

(10) Reg. No.: US H2228 H
(43) Published: Jan. 6, 2009

(54) TEMPERATURE COMPENSATED FLUID CONDUCTIVITY PIPING MEASUREMENT

(75) Inventors: James A. Eick, Folsom, PA (US); Douglas G. McDonnell, Media, PA (US)

(73) Assignee: The United States of America as represented by the Secretary of the Navy, Washington, DC (US)

(21) Appl. No.: 11/005,625

(22) Filed: Dec. 7, 2004

(51) Int. Cl.
*G01N 27/02* (2006.01)

(52) U.S. Cl. ..... 324/441; 324/439; 702/130

(58) Field of Classification Search ..... 324/439, 324/425, 441, 691, 693, 722, 446, 105, 431; 73/53.01, 708, 54.16, 54.43, 204.19, 861.01; 702/99, 130

See application file for complete search history.

(56) References Cited

U.S. PATENT DOCUMENTS 3,748,899 A * 7/1973 Gregg et al. ..... 73/170.34
3,774,104 A * 11/1973 Andersen ..... 324/441
4,220,921 A * 9/1980 Hach ..... 324/447
4,303,887 A * 12/1981 Hill et al. ..... 324/441
4,383,221 A * 5/1983 Morey et al. ..... 324/439
5,157,332 A * 10/1992 Reese ..... 324/445
5,466,366 A * 11/1995 Chia-ching ..... 210/85
6,404,204 B1 * 6/2002 Farruggia et al. ..... 324/441
6,489,774 B1 * 12/2002 van de Goor et al. ..... 324/439
2005/0127919 A1 * 6/2005 Feng et al. ..... 324/439

* cited by examiner

*Primary Examiner*—M. Clement
(74) *Attorney, Agent, or Firm*—Jacob Shuster

(57) ABSTRACT

A conductivity sensor positioned in-line between two pipe sections within a cylindrical collar portion of a measurement assembly measures the electrical conductivity of fluid under flow through a passage therein to generate a conductivity data signal, while a separate temperature measurement data signal is generated by a temperature sensor embedded within the collar portion of the measurement assembly in close axially spaced relation to the conductivity sensor. Both of the data signals are fed from the conductivity and the temperature sensors to a data processing system to provide a temperature compensated conductivity measurement readout.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEMPERATURE COMPENSATED FLUID CONDUCTIVITY PIPING MEASUREMENT

STATEMENT OF GOVERNMENT INTEREST

The invention described herein may be manufactured and used by or for the Government of the United States of America for governmental purposes without the payment of any royalties thereon or therefore.

The present invention relates generally to measurement of fluid electrical conductivity affected by the fluid temperature.

BACKGROUND OF THE INVENTION

It is usual practice to provide a fluid electrical conductivity measurement readout at a certain temperature such as 25 degrees Celsius. Such readouts require separate measurements of conductivity and temperature application of the temperature measurement value to its known relationship to conductivity for the particular fluid solution being tested, so as to provide a final reading of conductivity at 25 degrees Celsius for example. Such temperature compensated conductivity measurements of fluids currently utilize independent and separate pipe mounted conductivity and temperature sensors, respectively having separate signal data processing facilities from which the temperature compensated measurement data reading is derived. It is therefore an important object of the present invention to provide for a more simplified derivation of temperature compensated conductivity measurement data with respect to pipe conducted fluids.

SUMMARY OF THE INVENTION

In accordanc with the present invention, a conductivity sensor measurement assembly embeds a temperature sensor therein to provide temperature measurement signals that are processed together with electrical conductivity measurement signals from an axially spaced conductivity sensor within a flow passage of a cylindrical collar portion of the sensor measurement assembly 10 to promptly obtain therefrom a temperature compensated conductivity measurement readout.

DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
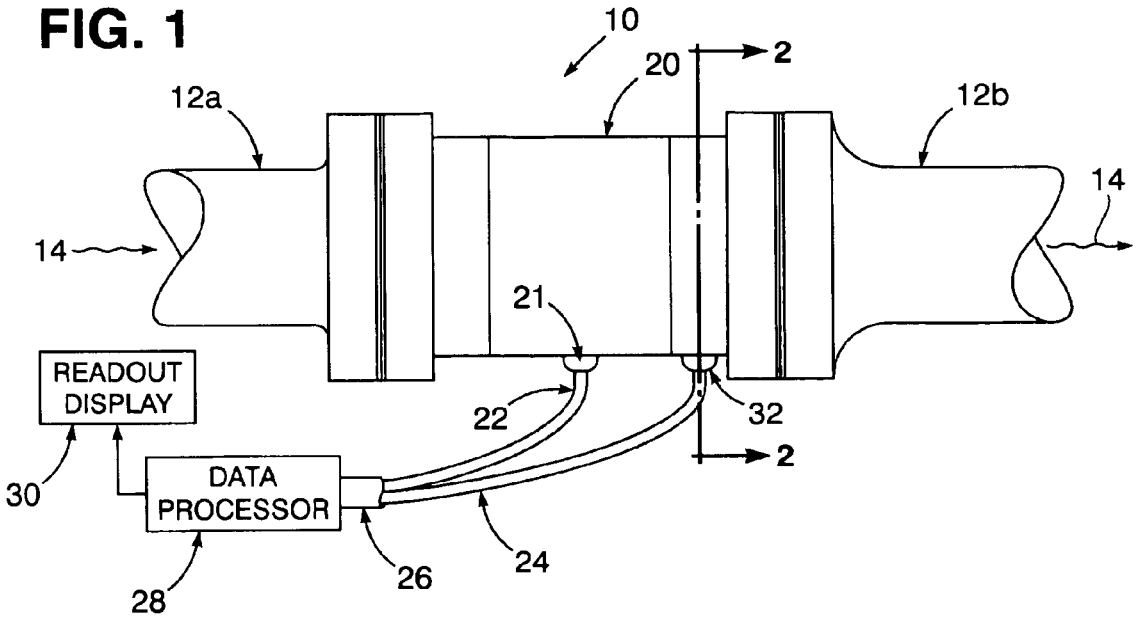
FIG. 1 is a side elevation view of a temperature compensated conductivity measurement sensor installation.

Referring now to the drawing in detail, FIG. 1 illustrates a conductivity sensor assembly 10 mounted between two pipe sections 12*a* and 12*b* through which some specific fluid solution is being conducted. Electrical conductivity of the fluid undergoing flow 14 within the pipe sections 12*a* and 12*b* is measured by the sensor assembly 10 with temperature compensation as hereinafter explained.

Figure 2:
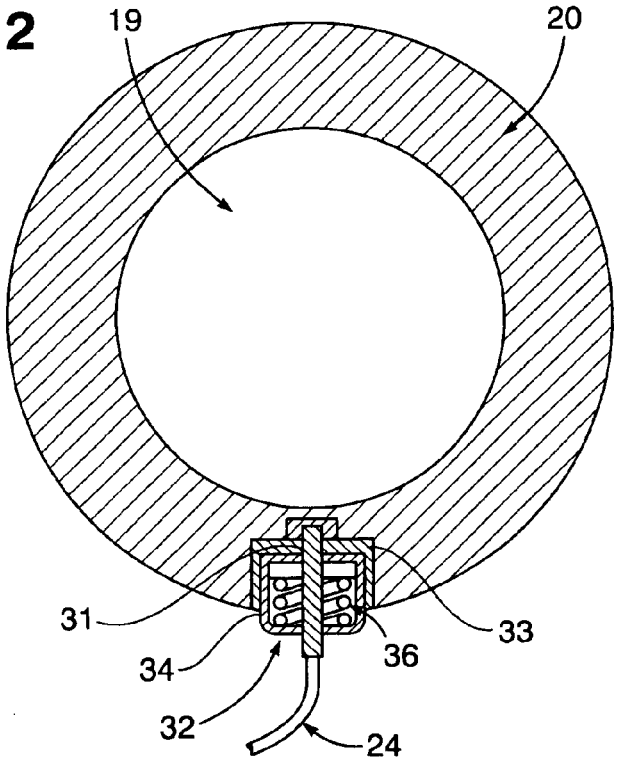
FIG. 2 is a section view taken substantially through a plane indicated by section line 2—2 in FIG. 1.

The conductivity sensor assembly 10 is of a two or three toroidal flow-through type positioned in line with the pipe sections 12*a* and 12*b* as shown in FIG. 1. The fluid while undergoing flow is in contact with an internal surface 18 of a sensor body in the form of a cylindrical collar portion 20 establishing an axial flow passage 19 through the sensor measurement assembly 10 as shown in FIG. 2. Electrical conductivity measurement of the fluid contacting the sensor body surface 18 is reflected in response to measurement by a conductivity sensor 21 from which signal transmission occurs through wiring 22, while temperature measurement of the fluid in contact with the surface 18 within the collar portion 20 is separately reflected by signal transmission from a temperature snesor 32 through wiring 24. Both the conductivity signal in the wiring 22 and the temperature signal in the wiring 24 are fed through multiple-conductor 26 to a data processor 28 from which a readout display 30 is obtained as diagrammed in FIG. 1.

Referring now to FIG. 2, the temperature sensor 32 includes a sensor element 31 shown embedded in contact metal 33 within the sensor body collar portion 20 of the sensor assembly 10. The contact temperature sensor element 31 utilized may be of various types, such as thermistors, resistance detectors (RTDs) and others. Also various methods for embedment of the temperature sensor element 31 within the sensor body collar portion 20 may be utilized, involving for example holding of the sensor element 31 under pressure of a spring 34 within a well formation 36 positioned within the collar portion 20, as shown in FIG. 2. The sensor element 31 is thereby maintained in contact with the metal 33. According to another method, molten metal is applied during fabrication of the sensor assembly 10 to permanently seal the temperature sensor 32 therein. The temperature within the well formation 36 is then equalized by thermal conduction with the fluid temperature in the piping 12*a*–12*b*. Such temperature is determined by measurement through the temperature sensor 32.

The readout display 30 diagrammed in FIG. 1 reflects fluid conductivity measurement, calculated as temperature compensated by the temperature signal received from the data processor 28, through which generally established mathematical relationship is established between the measured fluid conductivity and temperature values corresponding to any desired reference temperature.

It will be apparent from the foregoing description that a precise temperature compensated conductivity readout is obtained because of the location of the temperature sensor 32 in close axially spaced relation to that of the conductivity measurement sensor 21 within the sensor assembly 10 by embedment in its collar portion 20 and exposure to the fluid undergoing flow through the flow passage 19. Also the described arrangement involving use of the same sensor assembly 10 instrumentation for both conductivity and temperature measurements, provides for simplified installation at lower costs and less likelihood of damage to the piping 12*a*–12*b*.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a measurement assembly having an axial flow passage within which a fluid undergoes measurement of electrical conductivity at a location within said flow passage during flow therethrough producing a conductivity measurement data signal; temperature sensor means embedded within said conductivity sensor measurement assembly for generating a temperature measurement signal by exposure to the fluid within the flow passage in close axially spaced relation to said location of the electrical conductivity measurement; and data processing means receiving both the conductivity measurement data signal and said temperature measurement signal from the temperature sensor means during said flow of the fluid through the axial flow passage for interrelation of said signals to provide a temperature compensated conductivity readout with respect to said fluid.

2. The combination as defined in claim 1, wherein said measurement assembly includes a cylindrical collar portion through which the axial flow passage is extends and within which the temperature sensor means is embedded in said axially spaced relation to the electrical conductivity measurement location.

3. The combination as defined in claim 2, wherein said temperature sensor means is maintained under presure in contact with metal contact material in close proximity to the fluid during said flow thereof.

4. The combination as defined in claim 1, wherein said temperature sensor means is maintained under pressure in contact with metal contact material in close proximity to the fluid during said flow thereof.

* * * * *